United States Patent [19]

Crosbie

[11] Patent Number: 4,482,388
[45] Date of Patent: Nov. 13, 1984

[54] METHOD OF REDUCING THE GREEN DENSITY OF A SLIP CAST ARTICLE

[75] Inventor: Gary M. Crosbie, Dearborn, Mich.

[73] Assignee: Ford Motor Company, Dearborn, Mich.

[21] Appl. No.: 539,861

[22] Filed: Oct. 7, 1983

[51] Int. Cl.³ ............................ C09K 3/00; C08K 3/02
[52] U.S. Cl. ............................ 106/287.1; 106/287.29; 106/287.30; 524/789
[58] Field of Search ............ 106/287.29, 287.30, 106/287.10, 287.1; 264/56, 64, 66, 63; 501/97; 524/789; 423/348

[56] References Cited

U.S. PATENT DOCUMENTS

| | | | |
|---|---|---|---|
| 3,116,157 | 12/1963 | Borbach | 501/97 |
| 3,200,106 | 8/1965 | Dickson et al. | 106/287.3 |
| 3,356,513 | 12/1967 | Washburn | 501/97 |
| 3,376,247 | 4/1968 | Reddy et al. | 51/122 |
| 3,541,589 | 11/1970 | Lubatti | |
| 3,926,656 | 12/1975 | Mangels | 106/272 |
| 4,040,849 | 8/1977 | Greskovich et al. | 423/348 |
| 4,171,337 | 10/1979 | Rosen et al. | 264/56 |
| 4,177,230 | 12/1979 | Mazdiyasni | 264/60 |
| 4,217,320 | 8/1980 | Ezis | 264/65 |
| 4,301,020 | 11/1981 | Johnson | 252/62.62 |

OTHER PUBLICATIONS

"The Role of Polyelectrolyte Charge Density and Molecular Weight on the Adsorption and Flocculation of Collidal Silica with Polyethylenimine", Lindquist et al.; *Journal of Colloid and Interface Science*, vol. 55, No. 1, Apr. 1976, pp. 45–59.

Primary Examiner—Theodore Morris
Attorney, Agent, or Firm—William E. Johnson; Olin B. Johnson

[57] ABSTRACT

This specification is directed to a method of reducing the green density of an article cast from a casting slip containing silicon metal particles. The method is characterized by the step of adding to the casting slip ingredients a cationic polymer having a molecular weight in a range from 1,000 to 50,000. The cationic polymer is effective in the casting of the slip to form bridges between the silicon metal particles which keeps the particles from packing so closely together, whereby the green density of the cast article is lower and the article is more easily nitrided completely in thick section articles.

7 Claims, No Drawings

METHOD OF REDUCING THE GREEN DENSITY OF A SLIP CAST ARTICLE

TECHNICAL FIELD

This application is directed to a method of slip casting in order to produce an article. In particular, the application is directed to a method of slip casting a casting slip containing silicon so that the green density of an article cast thereby is reduced from what is normally obtained. A reduction in the green density of the slip cast article allows one to nitride the article in a uniform manner throughout the entire cross section of the article even though the article is of large cross section. Also, the rate of casting is increased and the useful life of the slip is extended.

BACKGROUND ART AND PRIOR ART STATEMENT

A search was conducted in the U.S. Patent and Trademark Office on the subject matter of this application. The search resulted in the citation of the following U.S. Pat. Nos. 3,116,157; 3,356,513; 3,376,247; 3,541,589; 3,926,656; and 4,177,230. While I believe that none of the cited patents teach or suggest the method that I claim in this application, I will discuss each of the cited patents hereinbelow.

U.S. Pat. No. 3,116,157 issued on Dec. 31, 1963, for a "Refractory Ramming Mix." This patent discloses that a polymer is added to a ramming mix and the polymer added must have silicon and oxygen in its composition in order to decompose to form a $SiO_2$ refractory bond. The polymers used in this patent are used in conjunction with organic solvents such as toluene, not with water, which is the common vehicle used in forming casting slips for a slip casting operation. Also, it is important to note, this patent is not related to a slip casting operation and is not in any manner instructive in the art of casting slips containing silicon metal particles.

U.S. Pat. No. 3,356,513 issued on Dec. 5, 1967, for "Production of Silicon Oxynitride." This patent shows some slip casting of $Si_2N_2O$ with polymer additives. A low molecular weight anionic polymer deflocculant (less than 1,000 molecular weight) is used optionally with a high molecular anionic polymer vehicle thickener (molecular weight being greater than 50,000).

U.S. Pat. No. 3,376,247 issued on Apr. 2, 1968, for a "Slip Casting Composition with Cyclopentadiene as a Deflocculant". This patent discloses the use of high amounts (5-12% by weight) of a polymer of molecular weight less than 300 in a nonaqueous vehicle for slip casting. There is no mention in this patent of slip casting of silicon articles.

U.S. Pat. No. 3,541,589 issued on Nov. 17, 1970, for a "Process for Preparing Silicon Nitride Coated Refractory Material." This patent relates to a $B_4C$-$Si_3N_4$ composite for use in coating other refractories. The patent does not discuss slip casting of material and in particular does not discuss the slip casting of a silicon metal containing slip.

U.S. Pat. No. 3,926,656 issued Dec. 16, 1975 for an "Improved Flow Molding Composition." This patent is directed to an injection molding system, not to a slip casting system.

U.S. Pat. No. 4,177,230 issued on Dec. 4, 1979, for a "Process for Producing Reaction Sintered Silicon Nitride of Increased Density." This patent is directed to an impregnation process for reaction bonded silicon nitride, not to a forming process such as slip casting of silicon which is subsequently nitrided.

Additional prior art that I am aware of which was not cited in the search on this subject matter includes U.S. Pat. Nos. 4,217,320 and 4,301,020. Also included is an article from the Journal of Colloid and Interface Science, Vol. 55, No. 1, April, 1976, entitled "The Role of Polyelectrolyte Charge Density and Molecular Weight on the Adsorption and Flocculation of Colloidial Silica with Polyethylenimine" by Lindquist et al.

U.S. Pat. No. 4,217,320 issued on Aug. 12, 1980, for a "Slip Cast Article Manufacturing Method." This patent is cited simply to show what a slip casting system is.

U.S. Pat. No. 4,301,020 issued on Nov. 17, 1981, for a "Process of Slurrying and Spray Drying Ceramic Oxides with Polyethyleneimine Dispersants." This patent is cited because it is the only example known to me of the use of a very high molecular weight polyethyleneimine polymer in any ceramic processing. The process disclosed in this patent, however, is a spray drying process not a slip casting process. Also, the process is used in the manufacture of ferrites and not in the manufacture of articles from silicon metal powder.

The Lindquist et al article is one in which a polyethylenimine (PEI)-water-Ludox AM colloid silica system was used as a model system to investigate the relationship of charge density and molecular weight of polyelectrolyte on the adsorption and subsequent flocculation of oppositely charged colloid particles.

DISCLOSURE OF THE INVENTION

This invention is directed to a method of reducing the green density of an article cast from a casting slip containing silicon metal particles. The purpose in reducing the green density of the article is so that the article, when subsequently subjected to a nitriding operation, will nitride in a uniform and efficient manner. The method is particularly useful in the production of articles of silicon nitride having a relatively thick cross section. Additionally, the casting rate is increased and the useful life of the slip extended.

A method of reducing the green density of an article cast from a casting slip containing silicon metal particles in accordance with my invention is characterized by the following step. A cationic polymer is added to the ingredients of the casting slip. The cationic polymer added is one which has a molecular weight in a range from 1,000 to 50,000. By adding the cationic polymer, the positive charges along the polymer backbone attach to the negatively charged particle surfaces of the silicon particles to form bridges from one particle to another. As the liquid vehicle is drawn out to cause solidification, the silicon particles cannot pack as closely together and more paths are left for the liquid vehicle of the slip to drain during the slip casting operation. The resulting article produced in the slip casting operation therefore has a lower green density than it would have if the cationic polymer was not added. Polymers of cationic, anionic, or nonionic type with very high molecular weight adversely increase the viscosity of the liquid vehicle which must drain and therefore would contribute to unacceptably low casting rates.

In accordance with a preferred embodiment of the method of my invention, the green density of an article cast from a casting slip containing silicon metal particles is characterized in the following manner. A cationic polymer is added to the casting slip. The cationic polymer has a molecular weight in a range from 1,000 to 50,000 and is present in the casting slip in a range of 0.01–0.50% by weight based on the total weight of the solid material contained in the casting slip.

In accordance with the most preferred method of my invention, the green density of an article cast from a casting slip containing silicon metal particles is characterized in the following manner. A cationic polymer is added to the casting slip. Most preferably, the cationic polymer has a molecular weight in the range 1,800 to 20,000. Most preferably, the cationic polymer is present in the casting slip in a range 0.05–0.25% by weight based on the total weight of the solid material contained in the casting slip.

BEST MODE AND INDUSTRIAL APPLICABILITY

The novel features that are considered characteristic of the method of my invention are set forth with particularity in the appended claims. The invention itself, however, both as to its organization and its method of operation, together with additional objects and advantages thereof, will best be understood from the following description of specific embodiments.

The following description of specific embodiments is what I consider to be the preferred embodiments of the method of my invention. The following description also sets forth what I now contemplate to be the best mode of carrying out my inventive method. The description is not intended to be a limitation upon the broader principles of the method of my invention, and while preferred materials are used in carrying out the method in accordance with the requirements of the laws, it does not mean that other materials cannot be used in the method.

EXAMPLE 1

This example will describe the preparation and use of a casting slip containing silicon metal particles modified as per my invention and used for fabricating a relatively thick article, in this case a 3" tall cone frustrum with a 3" diameter base and a 1" diameter top. Such articles are extremely difficult to nitride in a nitriding operation if the green density of the article is a normal density such as 1.72 to 1.75 g/cm$^3$.

The method of my invention will result in a reduction of the green density of the article cast from a casting slip containing silicon metal particles. The reduction in green density will permit easier nitriding of the article to its completely nitrided density. In fact, by following my method, it is possible to nitride the body throughout its entire extent, which is normally impossible in the situation where the green density of the article is its full normal green density.

The method of my invention is one in which a cationic polymer having a molecular weight in a range of 1,000–50,000 is added to the casting slip. As described above, this cationic polymer is believed effective to form bridges between the silicon metal particles which inhibit close packing of particles as the vehicle is drawn out, whereby the green density of the casting article is reduced.

In the first example, the cationic polymer used is polyethyleneimine (hereinafter PEI). A batch of 3,000 ml of slip containing 0.1% by weight of the weight of solids in the slip of PEI as an initial concentration was prepared in the following manner. To 1,505 grams of distilled water, the following ingredients were added: 429.6 grams of $Y_2O_3$, 7.58 grams of a 50—50 solution of PEI, 3.09 grams of $NH_4F$, and 23.3 grams of $Fe_2O_3$. The $Y_2O_3$ is used as a sintering agent well known in the art. The $NH_4F$ is used as a scavenger for any polyvalent inorganic cations which might otherwise remain in solution. The $Fe_2O_3$ is used as an aid in nitriding. This mixture was agitated for 24 hours on a rolling device.

The $Y_2O_3$ used was Molycorp No. 1161 with a specific surface area of 5.8 m$^2$/g as determined by the B.E.T. multipoint method. The 50—50 solution of PEI was prepared with equal parts by weight of distilled water and PEI. The PEI batch had a number average molecular weight of 9,300 as determined by membrane osmometry. Elemental analysis of the cationic PEI polymer gave 53.92% carbon, 11.87% H, 33.91% N, 0.42% O, and no detectable chlorine. The trade name of the PEI material used was Corcat P-18 of Cordova Chemical Company of Michigan. Reagent grades of $NH_4F$ and $Fe_2O_3$ were used.

Silicon metal powder was added in increments to the above mixture to a total amount of 3,120 grams. The powder used was characterized in the following manner. The powder had a weight average particle size of 2.9 μm and also had 90% of the particles finer than 5.4 μm and 10% finer than 0.9 μm as determined by x-ray sedimentation techniques. The silicon metal powder had a specific surface area of 3.3 m$^2$/g, by the B.E.T. method, and a chemical analysis which showed that the powder contained 0.3% iron, 0.08% aluminum, and 0.005% calcium.

Once the casting slip was made, it was constantly rolled on the rolling device for the next 13 days and adjustments were made to the slip to lower the viscosity and to permit outgassing of the slip as is well known in the slip casting art. The following adjustments were made during the 13 days, starting with the day zero as being the day the casting slip was initially prepared. On day four, 1.6 ml of the 1N $NH_4OH$ was made to lower the viscosity. On day seven, 5.0 ml of 1N $NH_4OH$ was added to further lower the viscosity. On day 11, 5.0 g of 50—50 solution of PEI was added to raise the polymer content of the casting slip to 0.18% by weight of the total weight of the particles in the slip. On day 12, 120 ml of distilled water was added to lower the specific gravity of the slip from 1.74 to 1.71 g/cm$^3$, and also 6 ml of 1N $NH_4OH$ to lower the viscosity. On the 13th day, the casting slip was ready for casting and it had the following properties. Specific gravity—1.71 g/cm$^3$ and Brookfield viscosity, at 50 rpm, spindle No. 2 of 260 cP, or 260 mPa.s.

A slip cast article as described above, mainly the 3" tall cone first run with a 3" base, was cast in a wax form located on a suitable plaster of paris base in a period of 3½ hours. A cast depth versus time plot, adapted for the nonparallel cone side, gave a better fit to a parabolic casting rate law than to a linear casting rate law. A coupon sample, 1"×1" base, was cast at the same time for comparison purposes. A casting rate for these articles of 2.81 cm$^2$/hr. was determined, for comparison, a much lower casting rate of 0.95 cm$^2$/hr. is typical for deflocculated slips with no cationic additives. The cast article had a green density of 1.38 g/cm$^3$ as compared to a green density of 1.72 to 1.75 g/cm$^3$ which would be achieved if no PEI was added to a deflocculated casting slip.

The wax form about the cone article was removed by cutting and the cast cone was lifted from the plaster block and dried at 75° C. for a period of two days. The article having the green density of 1.38 g/cm$^3$ was nitrided according to a demand nitriding cycle well known in the art. A ratio of weight after nitriding divided by the weight before nitriding was 1.54. The nitrided article was then sintered in a nitrogen overpressure for 2½ hours at 1973° C. and 1500 psi $N_2$. The finished article had an overall density of 3.09 g/cm$^3$. Density at the top of the cone was 3.07 g/cm$^3$ and the density at the bottom of the cone was 3.27 g/cm$^3$. X-ray evaluation of bars cut from the sintered cone showed only occasional pin prick voids under a microscopic examination.

EXAMPLE 2

In this example, a batch of slip was prepared from a different base composition. The base composition differed from Example 1 in that it included $Al_2O_3$ and deleted the use of $NH_4F$ and $Fe_2O_3$.

In accordance with this example, a batch of 500 ml of slip at 0.05% PEI initial concentration was prepared. The batch contained 0.05 g of PEI for each 100 g of solids in the slip. The slip was prepared by adding to 256.9 grams of distilled water the following ingredients: 76.2 g of $Y_2O_3$, 0.51 g of 50—50 solution of PEI, and 14.3 g of $Al_2O_3$, along with 5$Al_2O_3$ balls of about 0.5" diameter. This batch was rolled overnight to mix the materials. To the resulting mixture 517.5 grams of silicon metal powder, the same as described in Example 1, was added in increments.

The following adjustments were made to the casting slip. On day one, 0.2 ml of 1N $NH_4OH$ was added to lower the viscosity, and 2 ml of distilled water was added to lower the specific gravity. On the fourth day, the casting slip was ready to cast and it had the following properties: specific gravity—1.72 g/cm$^3$ and Brookfield viscosity of 80 cP. A coupon sample cast with a 1×1" base had a parabolic casting rate of 3.90 cm$^2$/hr and a resulting green density of 1.52 g/cm$^3$.

No further adjustments were made to the casting slip. On the 26th day, the slip was observed to thicken. If make-up water had been added, the slip would have had an even longer useful life. This example demonstrates that cationic polymer leads to desired low green densities, regardless of the presence or absence of minor particulate additives $NH_4F$, $Al_2O_3$, or $Fe_2O_3$.

EXAMPLE 3

This example is set forth in order to demonstrate the use of a cationic polymer different than that used in Examples 1 and 2. In this example, the cationic polymer is of the polyamidoamine type (hereinafter PAMAM).

A batch of 500 ml of slip at 0.05% PAMAM initial concentration was prepared by adding the following ingredients to 257 gram of distilled water: 73.6 g of $Y_2O_3$, 0.63 ml of 42.2% PAMAM solution, and 0.538 g of $NH_4F$. The PAMAM material used in this example was 42.2% active polymer on a weight basis in a solution with water. The solution had a number average molecular weight of 10,600. Elemental analysis of this cationic polymer gave 24.89% C, 9.13% H, 7.76% N, 41.90% O, and 12.34% Cl, all percentages being given by weight. This material was provided by Dow Chemical Company.

The mixture, as formed, was agitated overnight. To the agitated mixture, 534.4 g of silicon metal powder was added in increments. This powder is described by a weight average particle size of 3.7 $\mu$m, 90% finer than 6.4 $\mu$m, and 10% finer than 1.3 $\mu$m. The powder had a specific surface area of 3.5 m$^2$/g and a chemical analysis of 0.33% Fe, 0.07% Al, and 0.02% Ca.

Over the course of the next three days, adjustments were made to the slip as follows. On day one, 0.5 ml of 1N $NH_4OH$ was added to lower the viscosity. The slip was ready to cast on the fourth day and it had the following characteristics: specific gravity—1.72 g/cm$^3$ and Brookfield viscosity of 90 cP. A 1×1" coupon cast on a plaster base had a parabolic casting rate of 1.72 cm$^2$/hr and a green density of 1.58 g/cm$^3$.

The following adjustments were then made to the slip. On day four, 0.63 ml of 42.2% PAMAM solution was added to raise the viscosity; and on day six, the material was ready to cast and it contained a level of 0.1% PAMAM as the active cationic polymer. On day six, the casting slip had the following characteristics: specific gravity—1.72 g/cm$^3$ and a Brookfield viscosity of 640 cP. A 1×1" base coupon cast with this slip had a parabolic casting rate of 6.94 cm$^2$/hr and a resultant green density of 1.35 g/cm$^3$.

Additional adjustments were made to the casting slip as follows. On day six, 0.50 ml of 1N $NH_4OH$ was added in order to lower the viscosity of the slip. On the seventh day, the slip was ready for casting and it had the following characteristics: specific gravity—1.73 g/cm$^3$ and viscosity of 132 cP. A coupon cast as above described had a parabolic casting rate of 4.4 cm$^2$/hr. and a green density of 1.55 g/cm$^3$. This example shows that use of a different cationic polymer also produces the desirable results in that the desired low green densities are achieved in combination with casting rates that are even higher than with PEI.

EXAMPLE 4

This example is designed to show the longevity of the slip made as per Example 1. By longevity I mean that the casting slip is still able to cast acceptable green density articles at a period of time long beyond the time such a slip would normally discarded if the cationic polymer was not included therein. The cast shape in each case was a turbocharger and such a complex shaped article was cast on days 15, 25 and 34 from the date of silicon addition to the casting slip described in Example 1.

The description of the preparation of the slip and the adjustment to that slip to day 13 are given in Example 1. On that day, a cone was cast with a casting slip containing 0.18% by weight of the weight of solids in the slip of PEI.

Two days later, on day 15, with no further adjustments being made to the slip, a turbocharger was cast in 43 minutes. On day 23, PEI was added to bring the level of PEI to 0.25% by weight. A turbocharger was cast from that slip on day 25 in only 55 minutes. With no further adjustments, on day 34, another turbocharger was cast in 3 hours and 20 minutes.

This example demonstrates that turbochargers can be cast from the same slip in a workable period of time; that is, in less than four hours casting time, over a course of time of more than three weeks.

This example demonstrates that when a cationic polymer is added to a casting slip containing silicon metal particles, the life of the casting slip during which the desired low green densities and high casting rates can be obtained is prolonged for a substantial period of time. If no cationic polymer had been added to this slip, but rather that acids or flocculating inoganic cations had been added, the slip life would have been less than two days after destabilizer addition. It is a desirable feature that the slips containing cationic polymers tend to lower viscosity with time as long as slip specific gravity is maintained.

EXAMPLE 5

In this example, a composition similar to that of Example 1 is used for the slip. The slip, in turn, is used to produce turbocharger samples.

3,000 ml of casting slip for this example is prepared at 0.05% PEI initial concentration. This slip was prepared by adding to 1,550 g of distilled water the following materials: 429.6 g of $Y_2O_3$, 3.55 g of 50—50 solution PEI, 3.09 g of $NH_4F$, and 23.3 g of $Fe_2O_3$. This mixture was agitated for four hours. Silicon metal powder, the same as that in Example 1, was then added in increments for a total amount of 3,120 grams of silicon powder.

The following adjustments were made to the slip formed above. On day one, 20 g of distilled water was added to lower the specific gravity of the slip. On day seven, 3.55 g of 50—50 PEI solution was added to raise the viscosity of the slip, the concentration of PEI now being 0.1%. On day eight, 4.0 ml of 1N $NH_4OH$ was added to lower the viscosity of the slip. On day nine, the slip was ready for casting and it had the following characteristics: specific gravity—1.71 g/cm$^3$ and Brookfield viscosity of 100 cP. A 1×1" base coupon was cast to a thickness of 1.2 cm in one-half hour, corresponding to a parabolic casting rate of 3.04 cm$^2$/hr. The cast coupon had a green density of 1.55 g/cm$^3$.

The following adjustments were then made to the casting slip. On day nine, 0.70 ml of PEI was added to raise the viscosity, the concentration of PEI in the slip now being 0.11%. On the tenth day, the slip was ready to cast and it had the following properties: specific gravity—1.72 g/cm$^3$ and viscosity of 148 cP.

On the tenth day, a turbocharger was cast and the resultant article had a green density of 1.545 g/cm$^3$. This article was cast in two hours. After dewaxing and drying, the article was nitrided in a demand nitriding cycle. The article had a weight gain ratio of 1.544. The density as nitrided was 2.385 g/cm$^3$. The part was then nitrogen overpressure sintered to a density of 3.27 g/cm$^3$. The article was judged on a subjective basis by several examiners to be the "best yet" of any as-sintered SRBSN turbocharger. The uniform low green density has a beneficial effect on production of crack-free nitrided and sintered articles.

On day 11, the casting slip had the following properties: specific gravity—1.72 g/cm$^3$ and viscosity of 96 cP.

Another turbocharger was cast and the resultant article had a green density of 1.67 g/cm$^3$. The article was cast in 3 hours and 50 minutes. Upon nitriding, a weight gain ratio of 1.536 was observed. An as-nitrided density of 2.56 g/cm$^3$ was noted. After overpressure sintering, the article had a density of 3.310 g/cm$^3$. This part was also judged to be of excellent characteristics without any serious flaws.

While particular embodiments of the invention have been illustrated and described in the above examples, it will be obvious to those skilled in the art that various changes and modifications may be made without departing from the invention, and it is intended to cover in the appended claims all such modifications and equivalents as fall within the true spirit and scope of this invention.

I claim:

1. A method of reducing the green density of an article cast from a casting slip containing silicon particles, the method being characterized by the step of:
   adding to the casting slip ingredients, a cationic polymer having a molecular weight in a range from 1,000 to 50,000.

2. A method of reducing the green density of an article cast from a casting slip containing silicon particles, the method being characterized by the step of:
   adding to the casting slip ingredients, a cationic polymer having a molecular weight in a range from 1,000 to 50,000, said cationic polymer being pesent in a range from 0.01 to 0.5% by weight based on the total weight of the solid material contained in the casting slip.

3. The method of claim 2, wherein said cationic polymer is polyethyleneimine.

4. The method of claim 2, wherein said cationic polymer is polyamidoamine.

5. A method of reducing the green density of an article cast from a casting slip containing silicon particles, the method being characterized by the step of:
   adding to the casting slip ingredients, a cationic polymer having a molecular weight in a range from 1,800 to 20,000, said cationic polymer being present in a range from 0.05 to 0.25% by weight based on the total weight of the solid material contained in the casting slip.

6. The method of claim 5, wherein said cationic polymer is polyethyleneimine.

7. The method of claim 5, wherein said cationic polymer is polyamidoamine.

* * * * *